Figure 1:
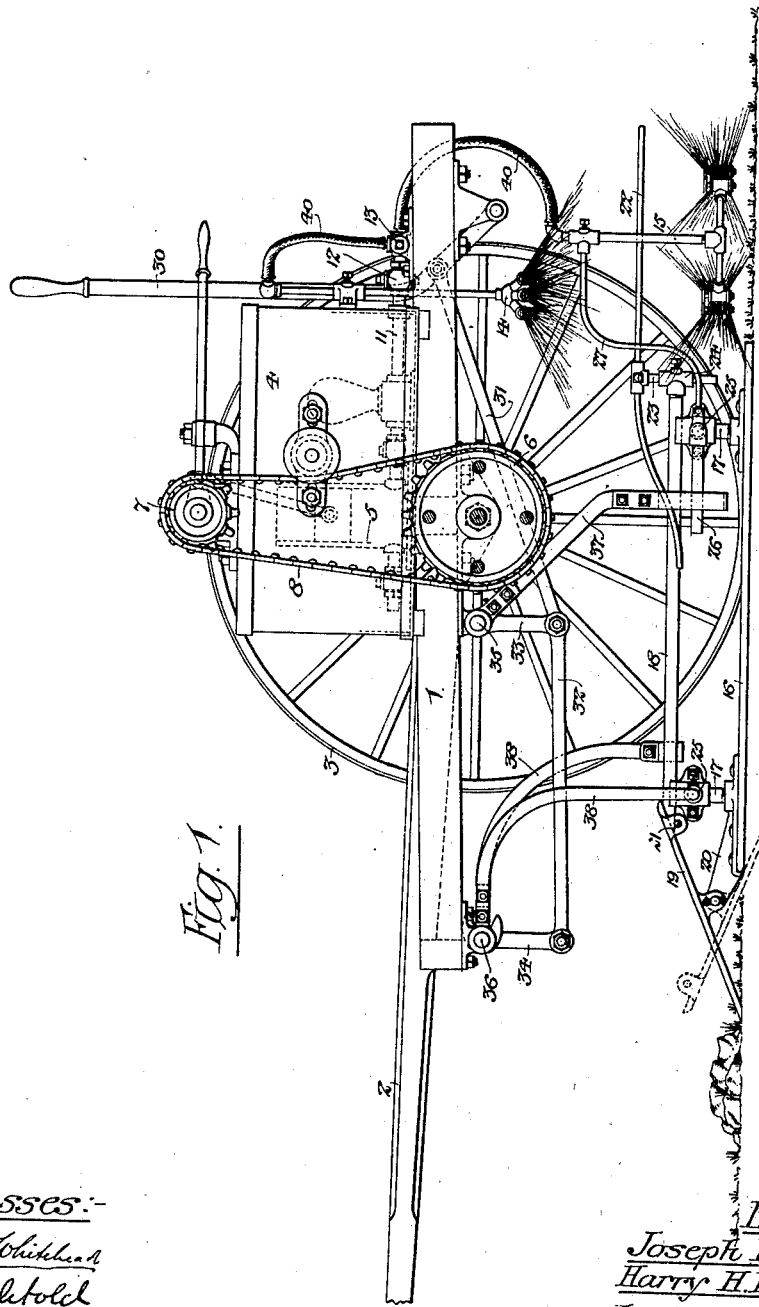

No. 668,950.  
Patented Feb. 26, 1901.  
J. & H. H. BRAKELEY.  
MACHINE FOR SPRAYING VINES OR PLANTS.  
(Application filed July 9, 1900.)

(No Model.)  
2 Sheets—Sheet 1.

Witnesses:—  
Louis M. F. Whitehead  
L. E. Bechtold

Inventors  
Joseph Brakeley.  
Harry H. Brakeley.  
by their Attorneys  
Howson & Howson No. 668,950. Patented Feb. 26, 1901.
J. & H. H. BRAKELEY.
MACHINE FOR SPRAYING VINES OR PLANTS.
(Application filed July 9, 1900.)
(No Model.) 2 Sheets—Sheet 2.
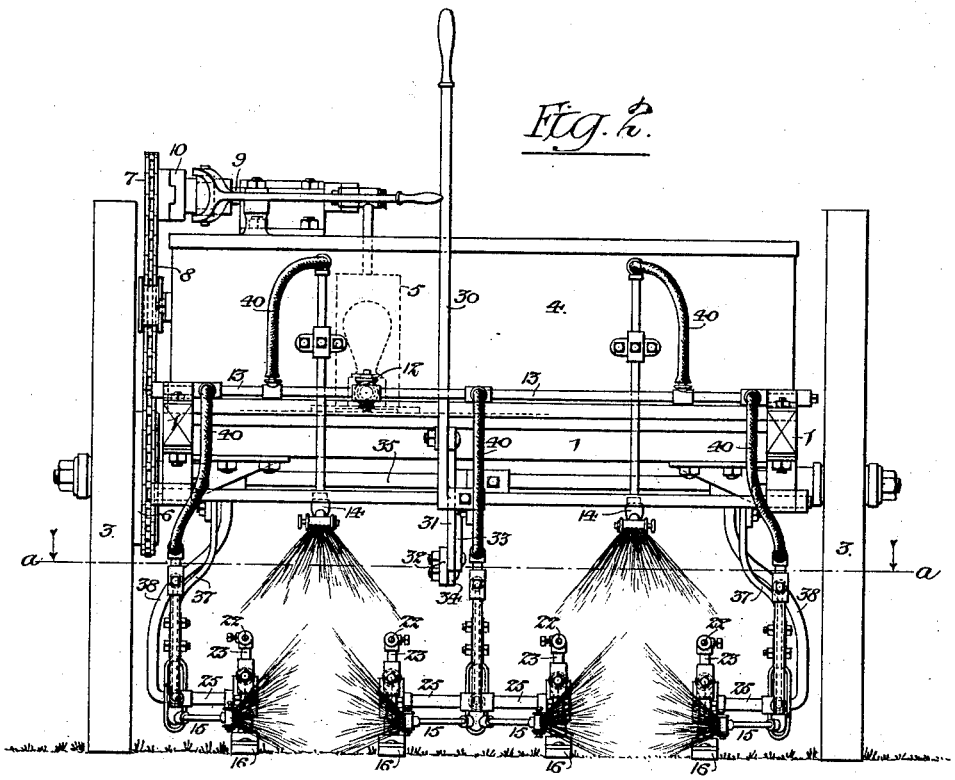
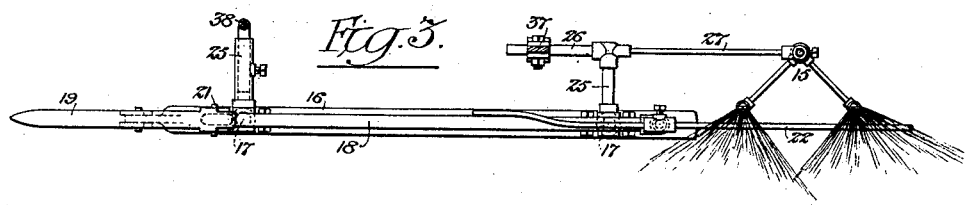
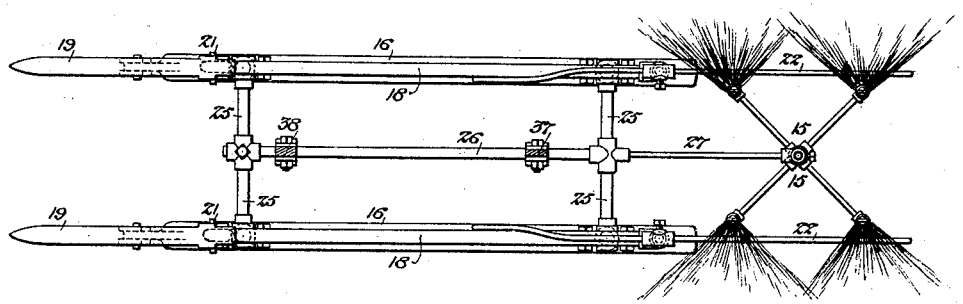

UNITED STATES PATENT OFFICE.

JOSEPH BRAKELEY, OF FREEHOLD, AND HARRY H. BRAKELEY, OF BORDEN-TOWN, NEW JERSEY.

MACHINE FOR SPRAYING VINES OR PLANTS.

SPECIFICATION forming part of Letters Patent No. 668,950, dated February 26, 1901.

Application filed July 9, 1900. Serial No. 22,999. (No model.)

*To all whom it may concern:*

Be it known that we, JOSEPH BRAKELEY, a resident of Freehold, Monmouth county, and HARRY H. BRAKELEY, a resident of Borden-town, Burlington county, State of New Jersey, citizens of the United States, have invented certain Improvements in Machines for Spraying Vines or Plants, of which the following is a specification.
The object of our invention is to provide a machine for effectively applying liquid insecticides or fungicides to growing plants or vines, an object which we attain in the manner hereinafter set forth, reference being had to the accompanying drawings, in which—

Figure 1 represents a side view of a machine constructed in accordance with our invention, the near wheel being removed. Fig. 2 is a rear view of the machine; and Fig. 3 is a sectional plan view on the line *a a*, Fig. 2, showing the vine lifting and spraying devices of the machine.

Many vines and plants are subject to the attacks of insect pests which can be destroyed only by applying the proper liquid insecticide directly to the insects upon the vine or plant, and unless all portions of the latter are reached enough of the insects frequently survive to ultimately kill the plant. The same is true of various forms of fungi to which vine or plant life is subject. We have therefore devised a machine whereby liquid insecticides or fungicides in the form of spray can be directed upon the vine or plant at so many different angles that there is little possibility of any portion of the same not being properly wetted by the spray, the machine being also provided with means for lifting fallen plants or vines for the action of the spray, so that it can be used for spraying plants or vines at various stages of growth, and it is adapted for ordinary fieldwork, where large areas have to be covered quickly and with but a small amount of labor.
The frame 1 of the machine is provided with a projecting shaft or pole 2 and may have any of the usual devices for attaching a draft-team thereto, and said frame 1 also carries short spindles or axles for the wheels 3, upon which the frame is mounted.

On the frame 1 is a tank or receptacle 4 for the liquid insecticide or other compound which is being employed, this receptacle containing a pump 5, which is driven from one of the wheels of the machine through the medium of sprocket-wheels 6 and 7, a chain 8, and a crank-shaft 9, the latter having a clutch 10, whereby it may be readily thrown into and out of operation. The discharge-pipe 11 of the pump has a regulating-valve 12 and communicates with a lateral pipe 13, having branches which can be connected by suitable flexible pipes with the spraying devices.

The machine shown in the drawings is intended for spraying two rows of plants at a time, and it consequently has two sets of sprayers, each set comprising a top sprayer 14, located above the center of the row, and opposite side sprayers 15, one on each side of the row. The top sprayer 14 has three nozzles—one discharging downwardly, one forwardly and downwardly, and one rearwardly and downwardly—and each side sprayer 15 has two nozzles—one discharging forwardly, upwardly, and inwardly and the other discharging rearwardly, upwardly, and inwardly—each spray-pipe being connected to the lateral pipe 13 by means of a suitable flexible hose 40, so as to permit rise and fall or other desired adjustment of the pipes. The jets may be multiplied and their direction changed, as desired, so long as they are adapted to direct the liquid onto the plants at the different angles necessary to insure the reaching of all portions of each plant by the sprays or jets. The forwardly and backwardly inclined side jets and the downwardly, forwardly, and backwardly inclined top jets have, however, been found by us to be efficient in practice.

When the plants or vines are young and maintain their upright position, the jets may be employed without any means for lifting the plants; but when the machine is intended for treating plants or vines which like the pea-vine lie over upon the ground after they have attained a certain stage of growth or for treating plants or vines which have been beaten down by storms we provide the machine with lifting mechanism consisting, essentially, of runners or slides 16, one on each side of each row, these slides having vertical studs or posts 17, upon which are supported bars or rails 18, which form elevated horizontal continuations of inclined lifter bars or fingers 19, hung to suitable lugs or brackets 20 at the forward ends of the slides 16 and connected to the forward ends of the bars 18 by ordinary "break-pins" 21, so that they may be free to turn over to the position shown by dotted lines in Fig. 1 when they meet with undue obstruction, such as would in the absence of this provision tend to injure or destroy the part of the machine coming into contact with it.

Each of the bars 18 may, if desired, have at its rear end a supplementary lifter 22, consisting of a rod or bar bent downwardly at its forward end to a point below the level of the bar 18, this supplementary rod being mounted in the T-head of a vertical stem 23, which can be adjusted vertically in a T-head 24 at the rear end of the bar 18, a suitable set-screw securing it in position after adjustment. The supplementary lifter 22 is susceptible of lateral adjustment by turning the stem 23 in the T-head 24.

The rear posts 17 have laterally-projecting studs 25, with T-heads, which carry forwardly-projecting bars 26 and rearwardly and upwardly bent spray-pipe holders 27, the latter being, if desired, free to turn in the T-heads, so as to swing the jets inwardly and outwardly and change their angle in respect to the horizontal. We, however, prefer to provide a rigid support for the spray-pipe holders and to vary the distance of the jet-nozzles from the plants or vines by using horizontal jet-pipes of the desired length.

In order to raise the plant-lifting mechanism and the side spray-pipes when the machine is not in operation, we employ a lever 30, which is connected by links 31 and 32 to arms 33 and 34 on rock-shafts 35 and 36, mounted in suitable bearings on the frame 1, the shaft 35 having suitable arms 37, which are slotted at their lower ends, so as to engage with the bars 26, and the shaft 36 having slotted heads, which constitute a lost-motion connection between said shaft and arms 38, which are connected to the forward studs 25 or to the forward end of the central bar 26, as shown in Figs. 1 and 3.

During the operation of the machine the same is drawn along the rows of plants or vines, so that the latter will pass between the lifting and spraying devices, the side jets directing their sprays upwardly, inwardly, forwardly, and backwardly, so as to thoroughly wet the front, the side, and the back portions of the plants or vines, the upwardly-projected portions of the jets or sprays also wetting the under sides of the leaves, while the top jets or sprays, being directed downwardly, forwardly, and rearwardly, wet the buds and tops of the plants or vines, so that by the combination of the two sets of jets the plants or vines are so thoroughly sprayed that there is very little chance of escape of an insect upon any part of the said vine or plant.

The machine can be drawn quickly along the rows of vines or plants, so that one machine can in a short time treat a large acreage, a single attendant being all that is necessary. Hence the amount of labor expended is very slight in proportion to the work accomplished.

The lost-motion connections between the sliding plant or vine lifters and the mechanism employed for raising them out of action permits said lifting devices to rise and fall to a limited extent to accommodate themselves to irregularities of the ground without imparting movement to the operating-lever 30, whereby the devices are raised out of action.

If desired, the receptacle for the spraying liquid may be an air-tight vessel, and the pump may be employed for compressing air therein, although a liquid-pump is preferred as the more convenient, or in some cases the pump may be dispensed with altogether and the hydrostatic pressure due to the elevation of the supply of liquid above the point of discharge may be relied upon for giving force to the sprays. The machine may also be enlarged laterally, so as to take in more than two rows of vines, the construction shown being preferred, however, as being more convenient and more readily handled than a larger machine.

Having thus described our invention, we claim and desire to secure by Letters Patent—

1. A spraying-machine comprising a supporting-frame, a tank thereon for the spraying liquid, and three sets of spraying devices one located above and one at each side of the row of plants or vines, and each comprising nozzles for directing jets or sprays of the liquid at different angles upon said plants or vines, substantially as specified.

2. A spraying-machine in which are combined a supporting-frame, a tank thereon for the spraying liquid, spraying apparatus comprising nozzles disposed so as to project sprays or jets at different angles upon the plants or vines, and lifting devices for said plants or vines, substantially as specified.

3. A spraying-machine comprising a supporting-frame, a tank mounted thereon and containing the spraying liquid, spraying devices supplied from said tank, and plant or vine lifting devices comprising slides or runners with elevated bars having inclined front ends for running under and raising the plants and vines, substantially as specified.

4. A spraying-machine comprising a supporting-frame, a tank thereon for the spraying liquid, spraying devices supplied from said tank, and plant or vine lifters comprising runners or slides having elevated lifting-bars with inclined front ends and supplementary lifting-bars at the rear ends of said main lifting-bars, substantially as specified.

5. A spraying-machine comprising a supporting-frame, a tank thereon for the spraying liquid, spraying devices supplied from said tank, and plant or vine lifters comprising runners or slides having elevated lifting-bars with inclined front ends and supplementary lifting-bars at the rear ends of said main lifting-bars, said supplementary lifting-bars being vertically and laterally adjustable in respect to the main lifting-bars, substantially as specified.

6. A spraying-machine comprising a supporting-frame, a tank thereon for the spraying liquid, spraying devices supplied from said tank, and plant or vine lifters comprising runners or slides having elevated lifting-bars with inclined front ends and supplementary lifting-bars at the rear ends of said main lifting-bars, said supplementary lifting-bars being both vertically and laterally adjustable in respect to the main lifting-bars, substantially as specified.

7. A spraying-machine in which are combined a supporting-frame a tank thereon, for the spraying liquid, spraying devices supplied from said tank, vine or plant lifting devices comprising runners or slides with elevated lifting-bars, and lever mechanism for raising said lifting devices out of action, substantially as specified.

8. A spraying-machine comprising a supporting-frame, a tank thereon for the spraying liquid, spraying devices supplied from said tank, plant or vine lifters comprising slides or runners, and elevated lifting-bars carried thereby, and lever mechanism for raising said lifting devices out of action, said lever mechanism having a lost-motion connection with the lifting devices, substantially as specified.

9. A spraying-machine comprising a supporting-frame, a tank thereon for the spraying liquid, spraying devices supplied from said tank, vine or plant lifting devices comprising runners or slides and elevated lifting-bars carried thereby and having inclined and pivoted front ends normally retained in operative position by break-pins, but free to turn to a reversed position on the breaking of said pins, substantially as specified.

In testimony whereof we have signed our names to this specification in the presence of the subscribing witnesses.

JOSEPH BRAKELEY.
HARRY H. BRAKELEY.

Witnesses as to Joseph Brakeley:
S. C. COWAN,
WILLIAM HYRES.

Witnesses as to Harry H. Brakeley:
CHAS. E. BURR,
SAMUEL E. BURR.